United States Patent [19]

Hawxhurst et al.

[11] 4,321,149

[45] Mar. 23, 1982

[54] PROCESS FOR REMOVING MULTIVALENT METALS FROM WASTE EFFLUENTS

[75] Inventors: Margaret H. Hawxhurst; Walter W. Slobbe, both of Seneca Falls, N.Y.

[73] Assignee: GTE Products Corporation, Stamford, Conn.

[21] Appl. No.: 945,266

[22] Filed: Sep. 25, 1978

Related U.S. Application Data

[63] Continuation of Ser. No. 582,248, May 30, 1975, abandoned.

[51] Int. Cl.³ .................................................. C02F 1/62
[52] U.S. Cl. ..................................... 210/720; 210/722; 210/725; 210/912; 210/913
[58] Field of Search .................... 210/50, 53, DIG. 25, 210/719–722, 724–729, 912, 913

[56] References Cited

U.S. PATENT DOCUMENTS 3,784,669  1/1974  Elges et al. ............................ 210/50
3,896,209  7/1975  Fournier et al. ...................... 210/50

Primary Examiner—Thomas G. Wyse
Attorney, Agent, or Firm—William H. McNeill

[57] ABSTRACT

The multivalent metals of iron and chromium are removed by reducing the metal values to their lowest valence state by acidifying to a pH of below about 6 and adding an excess of hydrogen peroxide. The reduction is conducted at the foregoing pH value and in the presence of a sufficient amount of an organic compound which is a stronger reducing agent than the metal in its lowest valence state. Thereafter, a sufficient amount of a reactive metal hydroxide source is added to raise the pH above about 7 and to form a metal hydroxide with the metal in its lowest valence state. The resulting metal hydroxide is then easily removed from the aqueous effluent.

10 Claims, No Drawings

PROCESS FOR REMOVING MULTIVALENT METALS FROM WASTE EFFLUENTS

CROSS-REFERENCE TO RELATED APPLICATION

This application is a continuation of Ser. No. 582,248, filed May 30, 1975, now abandoned, and assigned to the assignee of the present invention.

BACKGROUND OF THE INVENTION

1. Field of the Invention

This invention relates to the removal of multivalent metals, that is metals having more than one valence state, from waste effluent. More particularly, it relates to a process for the removal of iron and chromium in a form readily separated from the aqueous effluent using inexpensive raw materials.

2. Prior Art

Chromium is a noxious material and must be removed from waste effluent streams before such effluent can be discharged into rivers, streams, and the like. Various federal and state regulations now prevent certain metals from being discharged into waterways. Hexavalent chromium as a chromium ion, is the most common commercial form of chromium found in aqueous effluents. Heretofore, hexavalent chromium ($Cr^{+6}$) has been converted to trivalent chromium ($Cr^{+3}$). One such method is to use a reducing agent such as sodium bisulfite ($NaHSO_3$) to form chromium sulfate $Cr_2(SO_4)_3$, which is thereafter converted to chromium hydroxide $Cr(OH)_3$, and calcium sulfate ($CaSO_4$) by the addition of calcium oxide. $Cr(OH)_3$ is difficult to remove from aqueous streams since it forms a gelatinous precipitate and calcium sulfate is also a fine precipitate and is hard to filter. U.S. Pat. No. 3,391,789 also discloses using $SO_2$ to reduce $Cr^{+6}$ to $Cr^{+3}$ and the subsequent formation of $Cr(OH)_3$ by alkaline neutralization. In an attempt to overcome the defects with the beforementioned processes U.S. Pat. No. 3,493,328 uses a lead salt to react with the hexavalent chromium by forming lead chromate. Lead chromate however has a limited utility. Other U.S. Patents which disclose processes for recovering hexavalent chromium and other metal values are U.S. Pat. Nos. 3,575,854; 3,784,669; 3,810,542; and 3,819,051. In each instance, hexavalent chromium is reduced to the trivalent chromium which is the most stable form of chromium.

Various photographic and lithographic industries use aqueous solutions of dichromate-sensitized organic polymers such as polyvinyl alcohol that become insoluble upon irradiation with actinic rays. Additionally in the manufacture of printed circuit boards and color cathode ray tubes used for television such photosensitive organic solutions are used. In each instance, the polymers are exposed to a predetermined pattern of irradiation and the unexposed material is removed by water washes. The dilution of the dichromate-sensitized organic polymer aqueous solution makes it unsuitable for reuse or recycling. The diluted material, however, cannot be discharged without the removal of the chromate. The organic contained in the effluent when the chromium is converted to chromium hydroxide ($Cr(OH)_3$) makes the precipitate more gelatinous and more difficult to remove.

Another multivalent metal, iron, when it is in its highest valence state forms an extremely finely divided and gelatinous water-insoluble hydroxide. Because of the physical form of ferric hydroxide and chromium hydroxide, they are difficult to remove from the aqueous effluent using conventional filtration techniques. A method to remove these metals more readily would be an advancement in the art.

OBJECTS AND SUMMARY OF THE INVENTION

It is an object of this invention to provide a process for the removal of the multivalent metals of iron and chromium from effluents containing same.

It is another object of this invention to provide a more simple and economic method for the removal of the multivalent metals of iron and chromium from waste stream effluents.

It is a particular object of this invention to provide for the removal of chromium from waste streams.

These and other objects of this invention are achieved in one embodiment by providing a process for removing a multivalent metal selected from iron, chromium and mixtures thereof from an aqueous effluent by a process comprising: (a) reducing the metal to its lowest valence by the addition of an excess of a theoretical amount of hydrogen peroxide required to reduce the metal to its lowest valence while in the presence of greater than the stoichiometric equivalent amount (based upon the amount hydrogen peroxide present) of an organic compound that is a stronger reducing agent than divalent chromium while maintaining the pH at a level below about 6; (b) adding a sufficient amount of a reactive metal hydroxide source to form the multivalent metal hydroxide with the metal in its lowest valence state and to increase the pH above about 7; and (c) removing the resulting multivalent metal hydroxide solids from the aqueous effluent.

DESCRIPTION OF THE PREFERRED EMBODIMENTS

For a better understanding of the present invention, together with other and further objects, advantages, and capabilities thereof, reference is made to the following disclosure and appended claims in connection with the above description of some of the aspects of the invention.

In the process of the present invention, hydrogen peroxide is used to reduce the multivalent metal of either iron or chromium to its lowest valence state, however, free oxygen is liberated when hydrogen peroxide is so used. Normally one would expect the oxidation of the reduced metals to their higher state, however, with the presence of a reducing organic compound, the organic compound is preferentially oxidized and thus enables the subsequent precipitation of the multivalent metal hydroxide in the lower valence state such as $Cr(OH)_2$. Various oxidizable organics can be present in addition to polyvinyl alcohol that was previously mentioned, such as albumin, gelatin, glycols, sugars, their equivalent acids, and the like. Any water-soluble organic compound which is a stronger reducing agent than divalent chromium can be used since it will preferentially react with oxygen liberated from the hydrogen peroxide.

As previously mentioned, photosensitive solutions are a potential source of chromium and the organic contained therein is generally present in a stoichiometric excess of the amount of chromium present, however, when chromium or other multivalent metals are present in an effluent streams that does not contain an organic, it is necessary to add the organic.

The present invention is most easily described in relation to chromium, however, as heretofore pointed out it is not so limited. Similar reaction occurred with iron.

Hexavalent chromium reacts with hydrogen peroxide thus reducing the $Cr^{+6}$ to $Cr^{+2}$, however, oxygen is released. Such oxygen would normally oxidize $Cr^{+2}$ to $Cr^{+3}$, however, with the organic present the organic is oxidized thus using up the liberated oxygen.

In theory $2\frac{1}{2}$ moles of hydrogen peroxide are required to reduce 1 mole of hexavalent chromium to divalent chromium, and a $\frac{1}{2}$ mole of $H_2O_2$ is required to reduce one mole of trivalent iron to divalent iron. An excess of the theoretical amount of hydrogen peroxide is generally used to insure complete reduction. Since in addition to the oxygen liberated via the reduction reaction, hydrogen peroxide can also undergo a decomposition reaction to liberate oxygen thus potentially a molar equivalent amount of $O_2$ can be liberated for each mole of hydrogen peroxide used. Generally, about 2 moles of organic are required for each mole of $O_2$ since only one atom of oxygen reacts with a mole of organic, however, in the case of polymerizable material such as polyvinyl alcohol the molar amounts are based upon the monomer, such as vinyl alcohol. When a photosensitive solution is the source of chromium sufficient organic is present to react with the oxygen liberated by the hydrogen peroxide, however, when hexavalent chromium is present from a different source not containing the organic, the present invention enables the addition of the organic to the effluent in the amount heretofore specified and then by the subsequent addition of the hydrogen peroxide, the chromium is reduced to its divalent state. If an organic is to be added, organic acids can perform a dual function and are the preferred organic. Not only do they enter into the reaction but additionally lower the pH. Suitable organic acids include various dicarboxylic organic acids such as oxalic, malic, maleic and the like. At least about 5% excess of hydrogen peroxide is necessary and preferably from about 5% to 10% excess is used. A larger excess of hydrogen peroxide can be used, however, no advantages are gained and unneeded raw materials are consumed.

For precipitation of chromium or iron hydroxides a pH of about below 6 is required before adding a reactive metal hydroxide source. As used herein "a reactive metal hydroxide source" means a water soluble metal hydroxide or a water soluble metal oxide which metal is replaced with the multivalent metal of iron and chromium in an aqueous solution to form a water soluble multivalent metal hydroxide having the multivalent metal in its lowest valence state. Calcium oxide is the preferred reactive metal hydroxide source, however, other alkali metal and alkaline earth metal which form water soluble oxides or hydroxides are "reactive metals" as used herein. At about a pH of about 4 less than 50% of the chromium is precipitated. At a pH of below about 3.8 essentially all (above 97%) of the chromium is precipitated. While the process can be operated at any pH below 5 and some of the benefits achieved it is preferred to operate at from below 5 to about 4.2 or below about 3.8 for optimum results, however, because lime is later added, a pH of from 4.2 to about 5.0 achieves the same results with less lime consumption. Addition of oxalic acid to reduce the pH to the desired level enable the process to be operated in the 3.8 to 4.2 pH range with a reasonably good removal of chromium. Addition of oxalic acid and homologs thereof such as maleic acid and the like are of benefit if the effluent stream is also contaminated with iron since it is precipitated with the lime as $Fe(OH)_2$.

After the pH has been maintained at below about 5 for from about 5 to about 10 minutes to insure the reduction has occurred, a water soluble reactive metal hydroxide source is added to increase the pH to above about 7.

The metal hydroxide that is formed is easily precipitated since the metal is in its lowest valence state.

In an aqueous solution containing polyvinyl alcohol and chromium it has been found that the color of the solution can be used as a guide to the completeness of the reactions. For example,

| pH | Solution Color |
| --- | --- |
| 1–2.5 | Light Blue |
| 3–5 | Blue-Green |
| 5–6 | Violet |
| Above 7 | Yellow |

To more fully illustrate the subject invention the following detailed example is presented. All parts, proportions and percentages are by weight unless otherwise stated.

EXAMPLE I

About 1000 parts of an aqueous effluent containing ammonium dichromate and polyvinyl alcohol at a concentration of chromium of about 350 milligrams/liter and a pH of 5 is adjusted to a pH of about 2 with the addition of concentrated sulfuric acid. The amount of acid will depend upon other materials present in the effluent. A pH meter or other suitable means can be used to determine the sulfuric acid requirements. A sufficient amount of hydrogen peroxide is added to the effluent to yield a concentration of hydrogen peroxide of over 850 milligrams/liter. After agitating to insure proper distribution of the materials a sufficient amount of calcium hydroxide is added to adjust the pH to about 9. The effluent is filtered and analyzed for chromium. Analysis show that 98.7% of the chromium has been removed.

Additional tests following essentially the same procedure as above except the pH is held at various values before the hydrogen peroxide is added. Analysis of the filtrate indicates the following at the various pH values:

| pH | % of Chromium Removal |
| --- | --- |
| 2 | 99.1% |
| 3 | 98.6% |
| 4 | 45.0% |
| 5 | 98.9% |
| 6 | slimy precipitate |

The above example indicates that the pH must be below about 5 and that at about 4 the removal decreases and then increases again at about 3. In each of the above instances the pH was adjusted to about 9 with the addition of calcium hydroxide.

The optimum basic pH level by addition of lime is determined from several samples of effluent containing the same concentration of chromium. In each instance the pH level is adjusted to a value of 2 by hydrogen peroxide. Lower removal of chromium is found at pH values above 9 and below 8 with only 29% being removed at a pH of 6.

Thus, a basic pH is required with a pH of from about 8 to 9 being the optimum range.

By adding an aqueous 5% oxalic acid solution to adjust the pH instead of sulfuric acid the chromium removal is improved and is particularly increased at the pH level of 4. The percent removed is increased from about 45% to about 85%, and iron is more effectively removed when the oxalic acid is used to adjust the pH.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for removing a multivalent metal M, wherein M is selected from iron and chromium, from an aqueous solution, said process comprising:
    (a) reducing the metal to the $M^{+2}$ valence state by the addition of an excess of the theoretical amount of hydrogen peroxide required to reduce said multivalent metal to said $M^{+2}$ valence state and conducting said reduction in the presence of greater than the stoichiometric equivalent amount, based upon the hydrogen peroxide, of a water-soluble organic compound that is a stronger reducing agent than divalent chromium and at a pH of below about 6; whereby said stronger reducing agent reacts with the oxygen liberated by said peroxide reaction and prevents said $M^{+2}$ valence state from reoxidizing to the $M^{+3}$ valence state or higher;
    (b) adding a sufficient amount of a water-soluble reactive metal hydroxide source to form $M(OH)_2$ and to increase the pH above about 7; and
    (c) removing said $M(OH)_2$ solids from the aqueous solution.

2. A process according to claim 1 wherein said reactive metal is selected from the group consisting of alkali metal and alkaline earth metals.

3. A process according to claim 2 wherein said pH is raised by said reactive metal hydroxide to between about 8 and about 9.

4. A process according to claim 3 wherein a dicarboxylic organic acid is added.

5. A process according to claim 4 wherein said pH during said reduction is below about 5.

6. A process according to claim 5 wherein said water soluble organic compound is polyvinyl alcohol.

7. A process according to claim 6 wherein said reactive metal hydroxide source is calcium oxide.

8. A process according to claim 7 wherein both iron and chromium are present.

9. A process according to claim 8 wherein said dicarboxylic acid is selected from the group consisting of oxalic, malic and maleic acids.

10. A process according to claim 9 wherein said acid is oxalic acid.

* * * * *